United States Patent [19]

Mitchell, Jr.

[11] 3,872,448

[45] Mar. 18, 1975

[54] HOSPITAL DATA PROCESSING SYSTEM

[75] Inventor: Baker A. Mitchell, Jr., Houston, Tex.

[73] Assignee: Community Health Computing, Inc., Houston, Tex.

[22] Filed: Dec. 11, 1972

[21] Appl. No.: 313,684

[52] U.S. Cl. .......... 340/172.5

[51] Int. Cl. .......... G06f 15/06, G06f 15/42

[58] Field of Search .......... 340/172.5; 444/1

[56] References Cited

UNITED STATES PATENTS

| | | | |
|---|---|---|---|
| 3,316,539 | 4/1967 | Carleton | 340/172.5 |
| 3,611,301 | 10/1971 | Parks | 340/172.5 |
| R27,580 | 2/1973 | Rawson | 340/172.5 |

OTHER PUBLICATIONS

Allen, S. I., et al., "Use of a Time-Shared General--Purpose File-Handling System in Hospital Research," Proceeding of the IEEE, Vol. 54, Issue 12, December 1966, pp. 1641-1648, L7140111.

Baruch, J. J., "Hospital Automation Via Computer Time-Sharing," Computers in Biomedical Research, Vol. II, 1965, pp. 291-312, L71400042.

*Primary Examiner*—Raulfe B. Zache
*Attorney, Agent, or Firm*—W. F. Hyer; Marvin B. Eickenroht

[57] ABSTRACT

A system for automatically handling and processing hospital data, such as patient information and pathological test information, on an inline basis is disclosed as including a central data processing apparatus for storing and processing such data, a storage area in said information to be acted on, and providing for storage of new information, and a plurality of remote stations providing for data collection and inputting to said storage area, and readout of stored data from said storage area. The storage area in said data processing apparatus includes separately addressed files for relatively long term storage of patient description information, test library information, and past test results, and a transaction file for relatively short term storage of daily transaction data.

2 Claims, 5 Drawing Figures

TO OBTAIN A LIST OF SPECIMEN ACCESSION NUMBERS FOR INCOMPLETED TESTS AND THE ASSOCIATED PATIENT'S NAMES FOR A PARTICULAR TEST EG. TO MAKE UP A TECHNICIAN'S WORKLIST.

HOSPITAL DATA PROCESSING SYSTEM

BACKGROUND OF THE INVENTION

1. Field of the Invention

This invention relates to a system for automatically handling and processing hospital patient and pathological test data in a programmed data processing machine, and in one of its aspects to methods employed by the system for handling such data in the data processing machine.

2. Prior Art

Hospital administrators, nurses and laboratory technicians in a hospital or clinic of any size today must daily handle large volumes of data concerning patients in the hospital, and the various pathalogical tests performed on such patients. Although data processing machines which can handle, store and act on large volumes of information in relatively short periods of time have been suggested in the past for use in hospitals, satisfactory systems for the larger hospitals have not been provided because the storage arrangement of the data in the data processing machine has been broken down into relatively large numbers of separately addressed files, arranged so as to severely limit the useful storage capability of the computer, and the flexibility of the system. Since storage capability is a function of dollars to be spent, this factor alone can cause the data processing system to be too expensive for many hospitals. Also, in those computer systems designed for a particular institution, the systems used have not been such that they could accommodate rapid changes in pathology practices and rapid changes in computer equipment and technology.

BRIEF SUMMARY OF THE INVENTION

It is thus an object of this invention to provide an automatic data processing system for hospital use which overcomes the above noted shortcomings, to provide a practical and economical system for handling large volumes of routine hospital patient and pathological data.

Another object of this invention is to provide such a system which can readily accommodate changes in requirements for data storage and handling and changes in the type of peripheral equipment employed with the system.

These and other objects of this invention, which will be apparent upon consideration of the appended claims and drawings, and the following detailed description are accomplished according to the preferred embodiment illustrated by providing a central processing unit having a relatively small number of separately addressed data files, handling a large majority of information storage in the system, such as four main files and a plurality of remote stations. The system storage is essentially provided by four expandable files, three of which provide for permanent storage, and one of which is a daily transaction file. The remote stations include at least one administrative or patient entry station where the data concerning a particular patient can be entered and stored permanently or for a relatively long period of time in a Patient Description File (PDF) in the central processing unit, at least one test request station where a test request and patient information can be stored in a relatively short term Transaction File (TF) in the central processing unit, and read out at the test request station, and at least one data collection station, generally associated with one or more pathological laboratories, where test data and results may be inputed into the Transaction File from one or more analytical devices, or from a manual input by the operator. The remote stations may also include a high volume collection station where high volume inquiries and readouts may be performed, for example, of all tranactions in the Transaction File for a particular date.

Also a Test Library File (TLF) may be provided for relatively long term storage of information concerning each test available at the hospital. A Past Results File (PRF) may also be provided in the central processing unit and at the end of each day, or other suitable period, all completed tests during the day can be transferred into the Past Results File for permanent or long term storage.

By reference to a particular file, it is meant that a group of related information is stored in the storage area of the computer so that by a common request or address, generally of but a few characters, one can cause the computer to act on or scan the group of information. For example, all patient description information is stored with a patient number so that when the computer receives a request for information on a particular patient by this number, it is only necessary to scan the Patient Description File to find the appropriate patient number in the file, and then the information associated with that number can be printed out. Also, each type of test can be assigned a different number and the information concerning the various tests stored in the Test Library File can be accessed by the use of a single number. The specific files can also be broken down into a series of logical records (i.e., one logical record being all patients with last names starting with an A, a second logical record being all patients with last names starting with B, etc.) stored in a geographical record (a particular storage disk or a particular section of a storage disk wherein both the referenced first and second logical records would be located) and pointers provided in the program to the appropriate geographical record, so that when a particular logical record is being hunted it will only be necessary to scan the one geographical record containing it.

An important feature of the above described arrangement of the files in the central computer is that they are easily accessed by different departments or stations in the hospital to obtain the information that particular department requires. For example, a hospital administrator by using a particular test number may obtain cost information on that test from the Test Library File, while a technologist using the same test number may obtain a listing of the sample quantity for that test. As hospital and pathological requirements change it is a relatively simple matter to update the appropriate file without altering substantially the basic system or its underlying programs.

While reference has been made to four basic data files for use in the present system, a number of other files may be provided for facilitating handling of the data into and out of the basic files, as described below. By way of example, a group of pathological tests may form a test battery and some means (as to be described) may be provided for determining if a particular test is a battery test, and what tests are in a particular battery.

BRIEF DESCRIPTION OF THE DRAWINGS

In the drawings, wherein like reference numerals are used throughout to designate like parts, and wherein a preferred embodiment of the present invention is illustrated.

DETAILED DESCRIPTION OF THE DRAWINGS a. The System of FIG. 1.

1. The Central Data Processing Station

Figure 1:
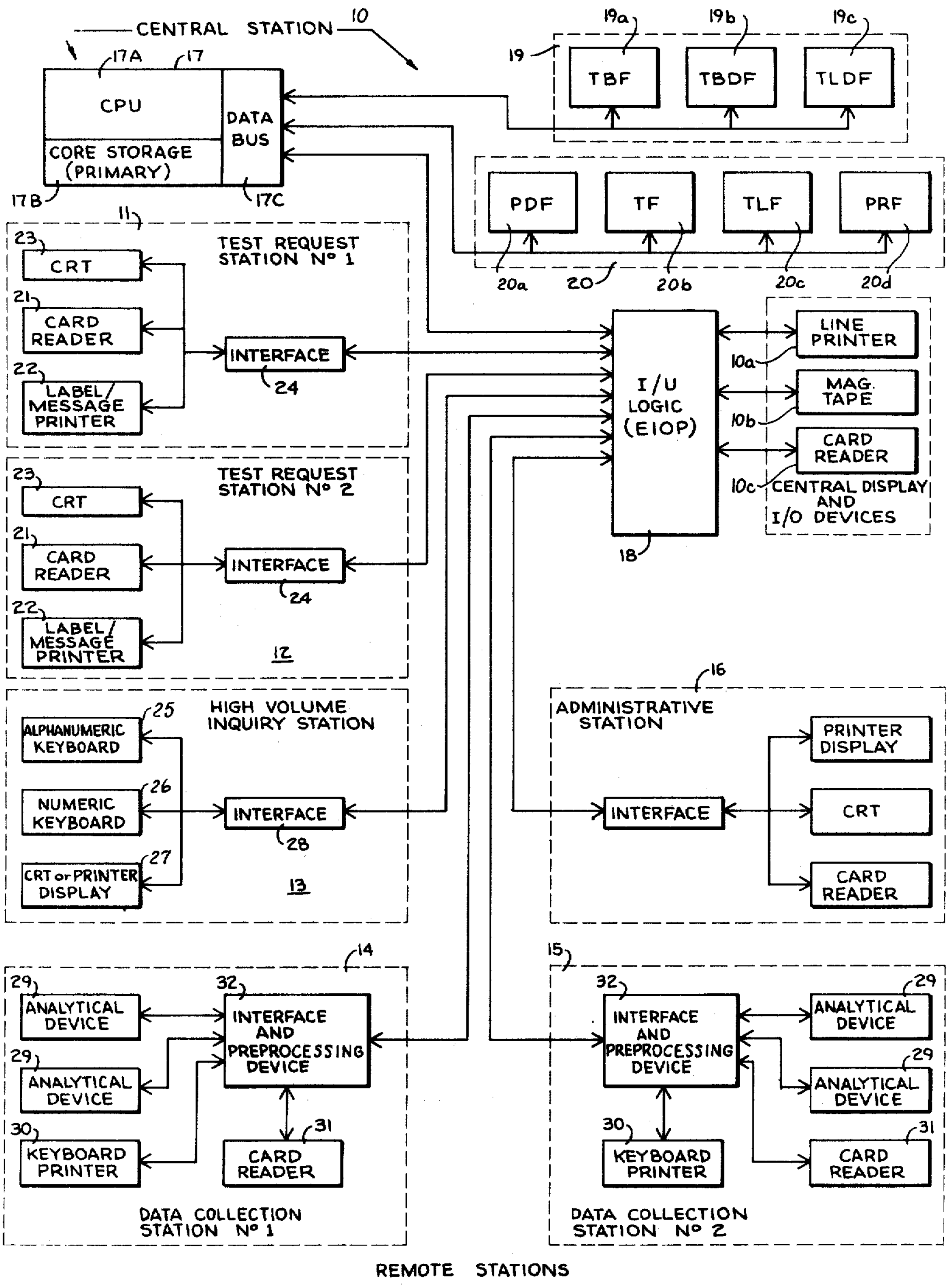
FIG. 1 is an overall schematic diagram of a data processing system of this invention.

Referring now to FIG. 1, the system of this invention is illustrated as including a central processing station 10 and a plurality of remote stations 11, 12, 13, 14, 15, and 16. Central station 10 includes a central data processing device or digital computer 17 which includes a central processing unit (CPU) 17A, a primary core memory section 17B and peripheral storage units 19 and 20 for storage of the various files incorporated in the system as hereinafter explained in detail. By way of example, computer 17 may be a Xerox Data Systems Sigma 3 digital computer. The software processors and file handlers may be written in FORTRAN IV for easy expansion and modification, and to provide a totally integrated system affording real-time processing simultaneously with background batch operation.

The Central Processing Unit 17A of computer 17 includes 24,000 16-bit words of core memory 17B with a read/write cycle time of about 975 nanoseconds. Communicating over a separate data bus 17C to primary memory 17A is an external input/output processor (EIOP) 18 (as referenced in Xerox Data systems, Inc. bulletin No. 64-11-01B(10/69)) which handles all input/output simultaneously with and independent of computer 17. A peripheral on-line random access storage unit 19 is provided which includes a high-speed 0.75 megabyte disc for the operating system and all software processors, and certain file directories may reside on this disc for very high speed operation, such as a Test Battery File (TBF) 19*a*, a Test Battery Directory File (TBDF) 19*b*, and a Test Library Directory File (TLDF) 19*c*. Also, a main file storage unit 20 is provided which includes a 24.5 megabyte removable disc pack unit with fast access time (160 milliseconds maximum total and 87.5 milliseconds average).

As illustrated in FIG. 1 the main files of the system are stored in storage unit 20 and include a Patient Description File (PDF) 20*a*, a Transaction File (TF) 20*b*, a Test Library File (TLF) 20*c*, and a Past Results File (PRF) 20*d*. While the type and number of directory files may differ in different embodiments of this system, and other peripheral files may be provided, the four main files listed are essential to the system. Also, each of the files referenced are stored in their respective storage disc so that the whole file, or an appropriate part of it, can be separately addressed and scanned for desired information by the computer.

Various display and input/output devices 10*a*, 10*b*, and 10*c* such as shown in FIG. 1, may also be provided at central station 10 for communications at the central station with the computer through EIOP 18.

2. The Remote Data Handling Stations

Communications between computer 17 and the remote digital stations 11–16 occurs through EIOP 18. In the system of FIG. 1, remote stations 11 and 12 are data request stations, which will be generally located at one or more of the nurse's stations in the hospital. For example, each of stations 11 and 12 may be utilized by a nurse who has drawn a sample from a patient, to request a particular test or group of tests on that sample. Each station may include a card reader 21 for input of a previously assigned patient number and a test number, and a message/label printer 22 for printing messages concerning a particular request, or a test result, and for printing a label for the particular sample to be tested. Also, if desired a CRT display 23 may be provided at stations 11 and 12, and a controller unit 24 (also as referenced in the above Xerox bulletin) for interfacing stations 11 and 12 with EIOP 18. As each test is requested, the files of computer 17 are updated with the test request information.

A high volume inquiry station 13 is also provided which may include a alphanumeric keyboard 25, a numeric keyboard 26, a CRT or printer display 27 and a controller unit 28 (also as referenced in the above Xerox bulletin) for interfacing station 13 with EIOP 18. Station 13 functions to provide high volume readouts such as listings of a total day's activities.

Also, one or more data collection stations 14 and 15 are provided generally located in or near to a pathological laboratory. Each of stations 14 and 15 include one or more analytical devives 29 (such as a device for performing coagulation profiling tests is shown in bulletin No. 2119-10-70-6RH of Technicon Instruments Corporation) providing on-line test data on a sample being tested, a keyboard printer 30 for printing messages, and a card reader 31 for inputting test data into computer 17. A separate data processor 32, such as a Xerox Data Systems CF 16 with 8,000 words of a 16-bit core memory is preferably provided at stations 14 and 15 for collection and pre-processing of test data from analytical devices 29, and interfacing with EIOP 18. Data processor 32 operates independently of central computer 17 except when results are passed for filing in the central computer and for checking. Data processor 32 may also be provided with additional magnetic tape storage units for temporary storage.

In addition to the above referenced remote stations, a remote station 16 may be provided at the administrative or admissions office for inputting patient information, or for reading out needed information on a patient (such as his location in the hospital, or state of his bill), or on tests available in the hospital, such as cost.

Of course, the number of remote stations will vary with different hospitals or clinics and the capabilities of each station and the peripheral equipment used at these stations can vary from those illustrated in FIG. 1 without departing from the basic system of FIG. 1.

b. Detail Description of the Data Files at the Central Station

Referring now to storage units 19 and 20, the files shown can be programmed to explicitly contain all procedural and operational details of laboratory functioning as well as current and past records of laboratory activity at the hospital in which the system of FIG. 1 is installed. A wealth of information concerning quality control, laboratory utilization, cost control information, and most important, a large volume of necessary information for research into the chemistry of disease patterns, can also be implicitly programmed into these files. The files are coherently structured in a straightforward manner making an orderly system of efficient, easily modifiable programs possible. This situation must prevail in order for a progressive, up-to-date system to evolve continually in fulfilling the everchanging needs of a modern hospital.

i. The Test Library File (TLF)

This file provides a complete library of all available tests at the hospital. A typical arrangement of this file in utilization of the present invention may be as shown in Table I below.

TEST LIBRARY FILE (TLF)

| Item Description | Record Number 1 | 2 | 3 | 4 | 5 | L |
|---|---|---|---|---|---|---|
| 1. Test Number | 97 | 101 | 153 | 551 | 203 | 613 |
| 2. Test Name | Sodium | BUN | GLU | Micro | $CO_2$ | Cloride |
| 3. Record Link To Specimen Type File | 1 | 1 | 2 | 4 | 1 | 1 |
| 4. R.L. To Specimen Amount File | 1 | 2 | 5 | 6 | 4 | 2 |
| 5. R.L. To Specimen Container File | 2 | 2 | 3 | 1 | 2 | 2 |
| 6. R.L.'s To Other Misc. Characteristics (Units, Time Available, Etc.) | — | — | — | — | — | — |
| 7. R.L. To Cost File | 1 | 4 | 3 | 5 | 1 | 5 |

TABLE I

For this file structure, by way of example, 30 storage sections (geographical records) of storage in secondary storage unit 20 may be set aside with 16 tests (logical records) stored in each section and 64 bytes allotted per test, or logical record. Since in actual use a very small portion of this file comprises about 90 percent of the activity, this portion can be grouped into one or two geographical records and held in primary storage 17B in computer 17, thus reducing the access time and facilitating access to these files. Thus, by grouping tests according to activity, the bulk of the accesses to the Test Library File would be only to core resident portions. Using one section (1,024 bytes) of storage unit 19*c* for the Test Library Directory File (TLDF) any test can be obtained in two accesses to the disk.

Also the Test Library File may contain a number of pointers or record links to sub files in the secondary storage, such as shown by Tables II to V below, so that if a 1 is under the appropriate record number column in Table I for item 3, the specimen type would be blood under record number 1, item 1 in the Specimen Type File. These sub files are illustrations of the types of files that can be provided to supplement the main file and conserve storage space in the main file since the record link would only require one or two bytes and the full name of the item would require several more.

SPECIMEN TYPE FILE (STF)

| Item Description | Record Number 1 | 2 | 3 | 4 | 5 | 6 |
|---|---|---|---|---|---|---|
| 1. Specimen Type | Blood | Urine | ISF | Smear | | |

TABLE II

SPECIMEN AMOUNT FILE (SAF)

| Item Description | Record Number 1 | 2 | 3 | 4 | 5 | 6 |
|---|---|---|---|---|---|---|
| 1. Specimen Amount | 1 ml. | 2 ml. | 10 ml. | 5 ml. | 24 hr. | Random |

TABLE III

SPECIMEN CONTAINER FILE (SCF)

| Item Description | Record Number 1 | 2 | 3 | 4 | 5 | 6 |
|---|---|---|---|---|---|---|
| 1. Specimen Container | Red Tube | Green Tube | Brown Bottle | | | |

TABLE IV

COST FILE (CF)

| Item Description | Record Number 1 | 2 | 3 | 4 | 5 | 6 |
|---|---|---|---|---|---|---|
| 1. Cost | $5 | $10 | $7.50 | $15 | $20 | |

TABLE V

The Test Library File is read-only except for when number performed is requested and primarily contains record links to standard phrase lists to reduce storage. The majority of these record links could well be reduced to one byte each. A standard phrase list can be readily prepared for these pointers and the program can be set up to automatically read out these phrase lists or the appropriate items in the phrase list (such as illustrated by reference to the Specimen Type File), or the record link can be manually compared with a prepared list. Whenever a test is requested, the Test Library File is accessed to insure that:

1. The test number is valid
2. The test is available
3. The correct test request card was used
4. Determine who should collect the specimen
5. In general, any special conditions required by the test are made known to the person requesting the test.

Whenever a technologist wishes to enter a test result into the Transaction File (to be described), the Test Library File is accessed to insure that:

1. The test number she gives is valid
2. The result is coming from the proper source 3. The result is within a reasonable range for the procedure or instrument used for that test.

Also, to aid in retrieving data concerning a particular test from the Test Library File, a Test Library Directory File may be provided as follows:

TEST LIBRARY DIRECTORY FILE (TLDF)

| Item Description | Record Number 97 | 101 | 153 | 203 | 551 | 613 |
|---|---|---|---|---|---|---|
| 1. Record Link To Test Library File | 1 | 2 | 3 | 5 | 4 | L |

TABLE VI whose file residence time exceeds the expected turnaround time can be printed. All incompleted tests whose residence time exceeds 4 times the expected turnaround time can be purged and listed for reordering if desired.

In many cases in a hospital or clinic, a number of tests may be arranged together as a battery of tests to be performed on a particular sample. In this case it may be desirable to provide a Test Battery File and a Test Battery Directory File in the secondary storage unit 19 structured as follows:

TEST BATTERY DIRECTORY FILE (TBDF)

| Item Description | Record Number 97 | 613 |
|---|---|---|
| 1. Record Link To Test Battery File | 1 | B |

TABLE VII

TEST BATTERY FILE (TBF)

| Item Description | Record Number 1 | B |
|---|---|---|
| 1. Battery Number | 97 | 613 |
| 2. Number of Tests In Battery | 2 | 1 |
| 3. Test Number | 101 | 203 |
| 4. Test Number | 203 | |

TABLE VIII ii. Transaction File

The file is the target for the majority of activity within the system. As tests are requested, accession numbers are assigned sequentially and the test number and patient number are entered. Later, as results become available they are inserted into the file along with the time of completion and the identification number of the technician performing the test. Queries for the current test results access this file directly if the query is by accession number or patient number.

Table IX illustrates a typical structure of this file:

This file may be structured to link tests on the same patient and contain a pointer to the patient in the Patient Result File.

To aid in obtaining information concerning a particular test when only the sample accession number is known, a Sample Accession Directory File (SADF) can be provided and such a file would be structured as follows in Table X.

TABLE X

SAMPLE ACCESSION DIRECTORY FILE (SADF)

| Item Description | Record Number ... 13 | 14 | 15 | ... 86 | ... 2165 |
|---|---|---|---|---|---|
| 1. Record Link To Transaction File | 2 | 3 | 4 | 5 | T |

iii. Patient Description File (PDF)

This file is programmed for patient identification information and is used primarily to link the patient number with other data such as name and location. Test requests are rejected for patients not appearing in this file.

In the illustrated example of FIG. 1, a patient may be included in the Transaction File by action from one of two sources. Pathology may add, delete or modify a patient entry as indicated by information received from admissions. Alternately, a nurse may enter a new patient via the keyboard at one of the test request stations 11 or 12 after her first attempt at requesting was rejected due to the patient's absence from the files. No existing entry may be altered by the nurse, however, except possibly the location or room number of a patient.

TABLE IX

TRANSACTION FILE (TF)

| Item Description | Record Number 1 | 2 | 3 | 4 | 5 | T |
|---|---|---|---|---|---|---|
| 1. Accession Number | 13 | 13 | 14 | 15 | 86 | 2165 |
| 2. Patient Number | 1032 | 1032 | 71340 | 55160 | 71340 | 23310 |
| 3. Test Number | 613 | 203 | 551 | 203 | 101 | 613 |
| 4. Date Ordered | 11/14 | 11/14 | 11/14 | 11/14 | 11/15 | 11/15 |
| 5. Result (<0) Or Test Life (>0) | 142 | −4 | −1 | −1 | −3 | −3 |
| 6. Status Codes, Tech. No., Etc. | . . . | . . . | . . . | . . . | . . . | . . . |
| 7. Record Link To Transaction File For Previous Tests | 0 | 1 | 0 | 0 | 3 | 0 |

By way of example, 75 storage sectors of 1,024 bytes each may be allotted for the Transaction File. The system can be programmed by a real-time clock in the computer which initiates a program so that this file is purged each night of all completed tests which are added to the Past Result File to be described. In addition to a journal of the merger, all incompleted tests Table XI below illustrates a typical structure of the Patient Description File when utilized in accordance with this invention. As in the previously discussed files a number of record links are provided (items 6 and 7) to data in other files. Entrys may be made by admissions when a patient enters the hospital and updated as tests are performed on the patient.

TABLE XI

PATIENT DESCRIPTION FILE (PDF)

| | Item Description | Record Number 1 | 2 | 3 | 4 | 5 | P |
|---|---|---|---|---|---|---|---|
| 1 | Patient Number | 71340 | 1032 | 23310 | 55160 | | 987 |
| 2. | Patient Name | Smith | Doe | Brown | Jones | | Green |
| 3. | Sex | M | F | M | F | | M |
| 4. | Birth Date | 1940 | 1908 | 1950 | 1932 | | 1941 |
| 5. | Other Items | . | . | . | . | | . |
| | | . | . | . | . | | . |
| | | . | . | . | . | | . |
| 6. | Record Link To Transaction File For Last Test | 5 | 2 | T | 4 | | 0 |
| 7. | Record Links to Past Results File | 8 | 6 | 0 | 11 | | 0 |
| | | 14 | 22 | 0 | 0 | | 0 |
| | | 43 | 0 | 0 | 0 | | 0 |
| | | 72 | 0 | 0 | 0 | | 0 |
| | | . | . | . | . | | . |
| | | . | . | . | . | | . |
| | | . | . | . | . | | . |
| | | 0 | 0 | 0 | 0 | | 0 |

iv. Past Result File (PRF)

The Past Result File is an archival file capable of storing well over a million test results. In accordance with this invention, it is updated each night or other relatively short time period, by the addition of the completed tests from the day's Transaction File.

Thus, the Past Result File is, in effect, sorted by date. Further it could be sorted by patient number and test number. All of the actual sorting is done on the Transaction File before transfer to the Past Results File.

While the Past Result File will typically contain more than a year's pathology activity it can be programmed so that cumulative patient reports span a fourteen day period. Therefore to speed generation of these reports, pointers to each patient's test results are maintained in the Patient Description File (item 7) for the most recent 2 weeks of test activity. These pointers are redundant and are used merely to increase search efficiency both for the cumulative reports and for the inquiries regarding tests in the recent past. Of course, current day's tests are readily available from the Transaction File.

Table XII illustrates a typical file in accordance with this invention for the Past Result File:

ing that entry. Thus, the responsibility for correctness will lie directly upon the individual making the entry, and the individual should be fully cognizant of this fact. In addition, checks should be made with the Test Library File or Patient Description File whenever possible to insure that the entry is consistent with other information contained in the system.

Also, the various files described can be added to or deleted as required for a specific system and problem encountered. For esample, item 5 (or additional items) in the Patient Description File could contain the name of the attending physician, date admitted, past credit experience, etc. Also items (item 6 or new items) such as availability of test could be added to the Test Library File. Of course, many other examples could be given.

An important feature of this invention is that the four basic files described are flexible to permit updating of the information without requiring that the system be restructured.

c. Operation of the sytem of FIg. 1

FIGS. 2–5 show flow charts that illustrate the operation of the system of FIG. 1 with the file structures as set out in tables I–XII. The symbols in the flow charts are keyed to the appropriate record or item in the files of tables I–XII. These flow charts illustrate only four specific routines of the system FIG. 1, and of course a number of other routines can be provided depending upon the needs of a particular hospital and the extent of the software of the system. However, it is believed that the illustrated flow charts are sufficient to show the relationships between the various files of the system, and the functions of these files.

In reading these flow charts, the right hand item in a

TABLE XII

PAST RESULTS FILE (PRF)

| | Item Description: Header | Test | Record Number 6 | 7 | 8 | 9 | 10 | 11 ... |
|---|---|---|---|---|---|---|---|---|
| 1. | Header Flag (−1) Or Test Number | | −1 | 97 | −1 | 613 | 203 | −1 |
| 2. | Patient Number | Date Ordered | 1032 | 11/05 | 71340 | 11/04 | 11/04 | 55160 |
| 3. | Date Completed | Result | 11/06 | 53 | 11/06 | 16 | 42 | 11/07 |
| 4. | Other | Tech No. | — | — | — | — | — | — |
| 5. | Other | Other | — | — | — | — | — | — |

The program utilized in the system of FIG. 1 should be written to include extensive quality control procedures to provide monitoring of error rates. In addition, hard copy audit trails should be provided all the way back to the source of the original entry for tracing purposes. However, the most important consideration is to take every step possible to avoid errors at their source before they enter the formal portions of the system.

Also, the various programs of the system should be all written to immediately echo each entry to the nurse or technologists for acknowledgements prior to acceptparticular box is the particular file being accessed, the next item to the left is the particular record column (vertical columns in Tables I–XII) being scanned, the next item to the left is the particular item row (horizontal row of tables I–XII in which the item of interest is found), and "Temp" refers to the desired item in the desired column which is then acted on by the remainder of the program. Also, certain letters are used in the flow charts to designate certain file parameters, such as P = current last used record in PDF
T = current last used record in TF
R = current last used record in PRF
A = current last used accession number.

Figure 2:
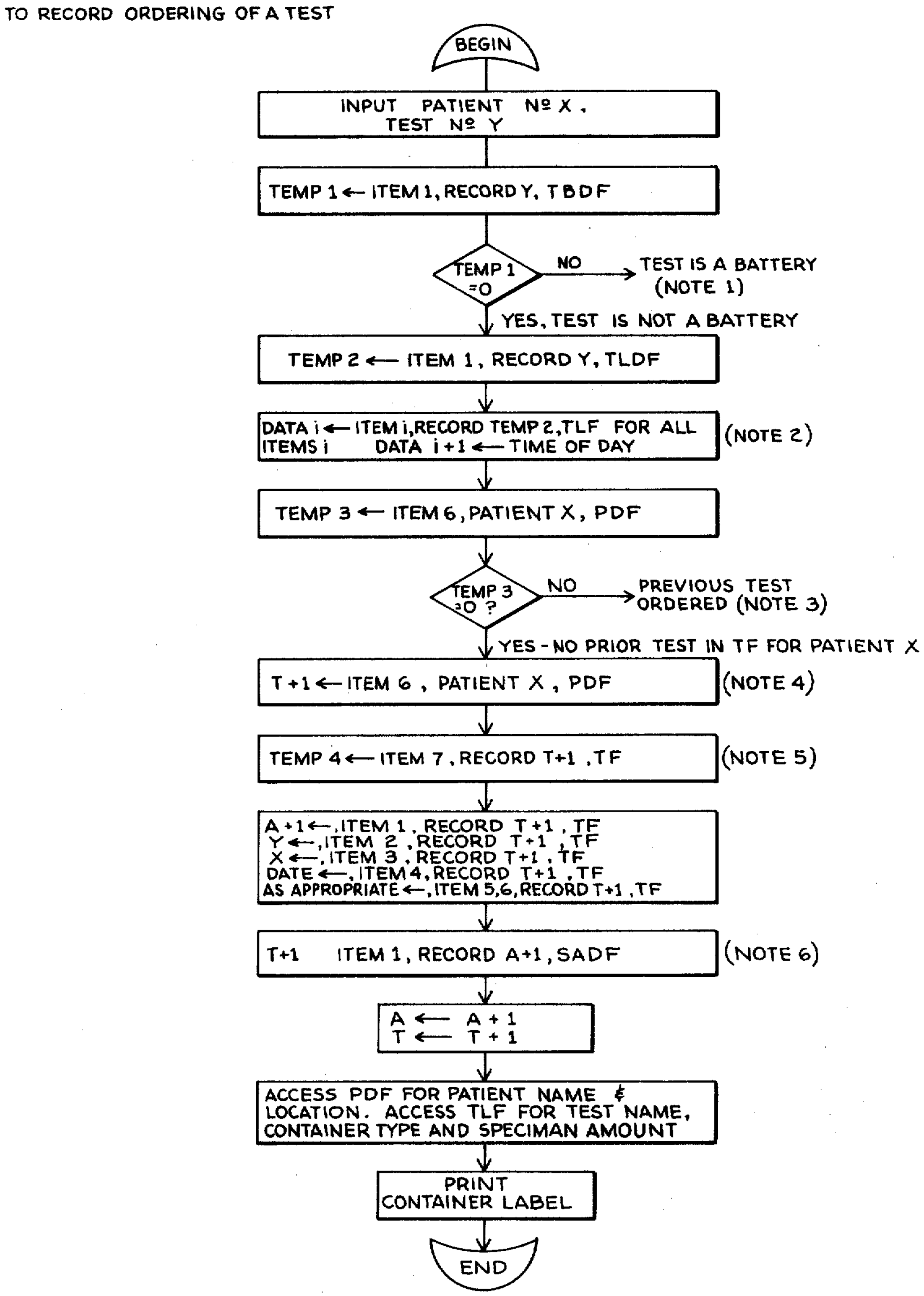
FIG. 2 is a detailed flow chart of the system of FIG. 1 when a particular test is ordered on a particular patient.

Referring to FIG. 2, where the operation of the system of FIG. 1 is illustrated when a test is ordered at one of test request stations 11 and 12, presume that a nurse arrives at request station 11 with a test request data card having the test type and patient number marked and a test specimen from the patient in the appropriate container. She will insert the test request card into card reader 21 whereupon computer 17 will validate the circumstances of the request through the Test Library File, retrieve the patient's name and room number from the Patient Description File, enter the request into the Transaction File assigning the accession number; and lastly, print the appropriate messages and/or specimen labels on the label printer located adjacent to the card reader. The nurse can then affix one label to the specimen container, another to the test request card, and place these in an "In Box" for delivery to the laboratory and execution of the test.

In FIG. 2, note 1, when it is determined that a test battery is involved (i.e., temp 1 does not equal zero when the Test Battery Directory File is addressed), the Test Battery File is accessed to obtain the individual tests which make up the battery. The routines then proceed similarly as for a single test, but repeating the steps for each test in the battery.

Regarding note 2, FIG. 2, at this point in the routine it may be desirable to check the appropriate items of the Test Library File under the designated test to determine if the test is available, no appointment is required, etc.

If accessing the Patient Description File determined that a patient has had a previous test ordered (Note 3), the prior test results in the Transaction File can be scanned to determine if a previously drawn sample may be used without having to collect a different sample. The accession number of the previous sample can be used to obtain a pointer from the Sample Accession Directory File (table X) to the appropriate place for the previous test or sample information in the Transaction File.

Note 4 in FIG. 2 refers to the fact that when the Patient Description File is accessed with item 6 for a particular patient, a record link is established for the patient's record to be the next available record (i.e., T + 1) in the Transaction File. Note 5 refers to the fact that when record T + 1 under item 7 in the Transaction File is accessed, a record link to the Transaction File for a previous test result on that patient is established, until item 6 under that patient is zero in the Patient Description File at which time the chain of linking test is stopped. Note 6 refers to the fact that when the program ends it is necessary to update the file parameters A and T by adding 1 to them so that the next rising test request will result in the next available accession number being assigned.

Figure 3:
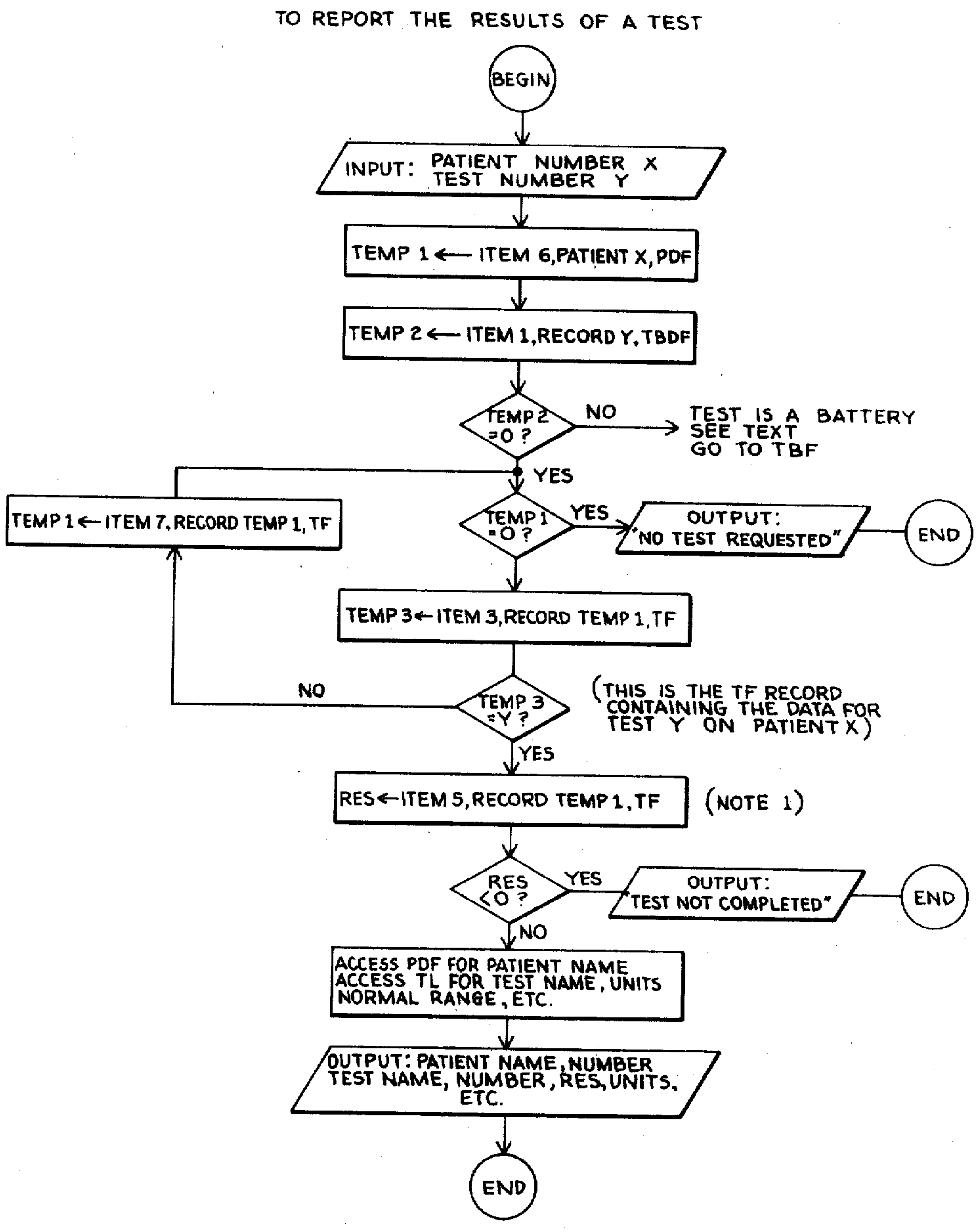
FIG. 3 is a flow chart showing the system of FIG. 1 when the results of a particular test are being reported.

FIG. 3 shows the routine of system 1 to report the results of a test. This assumes that the data concerning the test (if completed) has been collected at one of data collection stations 14 and 15 and inputted into the Transaction File at the appropriate data collection station. The test result request will generally be made at one of the test request stations 11 or 12, or at station 13.

Again, the same procedure occurs as described with respect to FIG. 2 if the test is a battery. The remainder of the flow chart is believed to be self-explanatory.

To input the data concerning a particular test, such as the one on the data collection stations 14 or 15, the routine at the data collection station would be the same as in FIGS. 2 down to 1, at which point the test result data, which would have been collected by preprocessing device 32, is transferred into the appropriate place in the Transaction File where it can be attained by the FIG. 2 routine.

Figure 4:
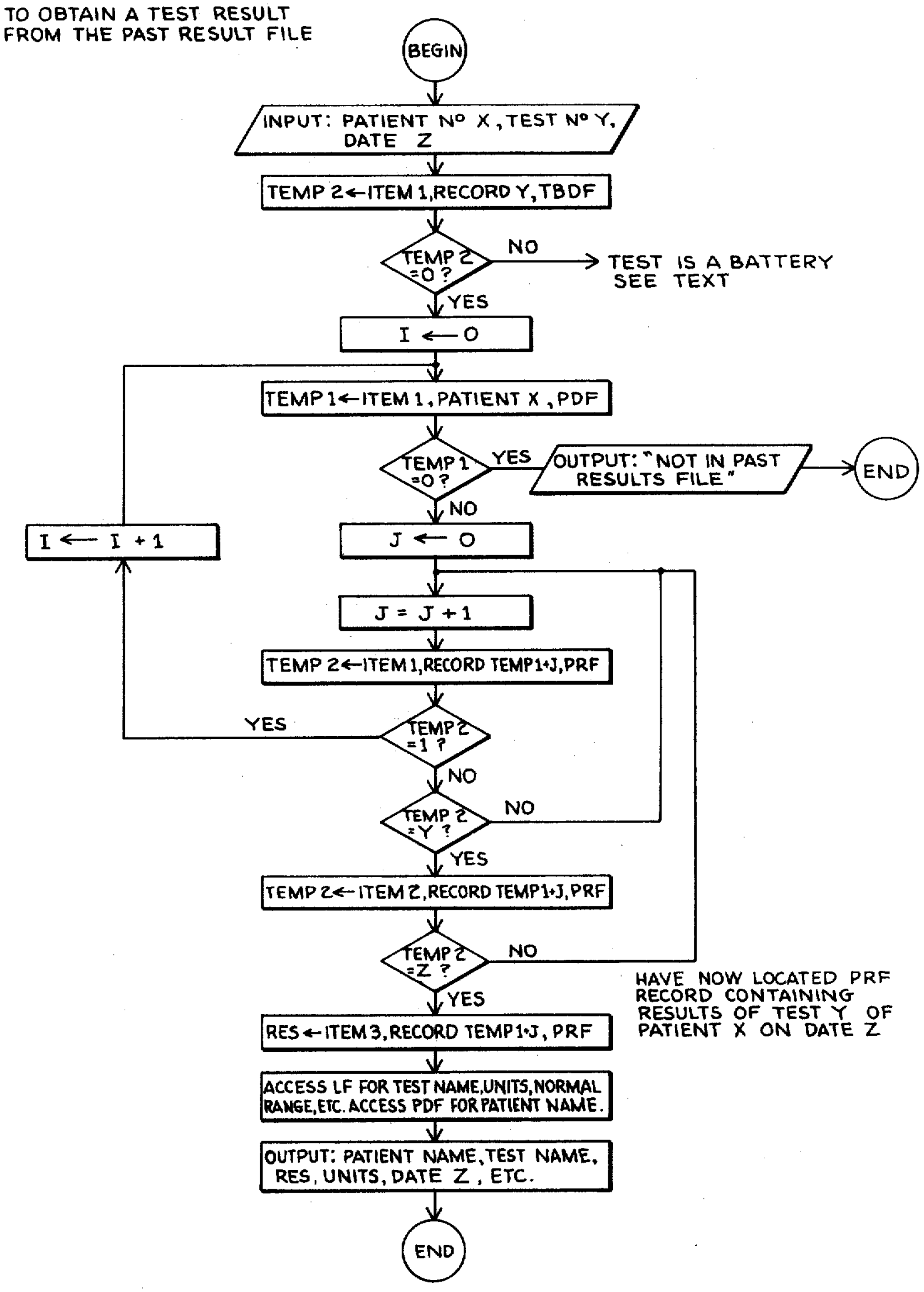
FIG. 4 is a flow chart of the system of FIG. 1 when past test results are being reported for a particular patient.
Figure 5:
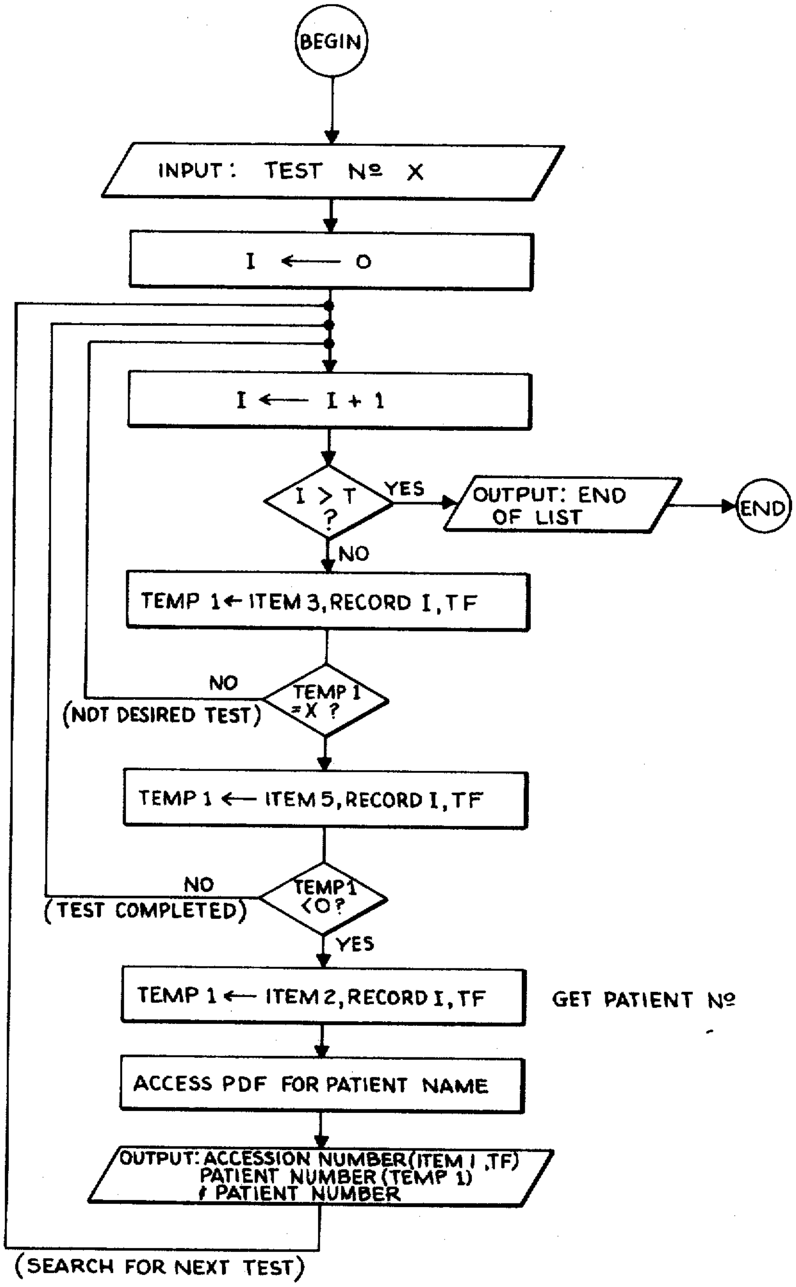
FIG. 5 is a flow chart showing the system of FIG. 1 when a list of sample accession numbers for incompleted tests of a particular type is requested.

FIG. 4 illustrates the routines of system 10 when a test result is requested from the Past Results File. In the flow chart of FIG. 4, the letter I refers to the items 7 filed in the particular column related to patient X in the Patient Description File (Table XI), and the symbol I + 1 refers to the fact that during the routine each of the separate items 7 in that patient number column will be separately acted on to determine whether that item is or is not zero. If all are zero, then the output "not in past results file" occurs. The letter J refers to the fact that each record number column of the Past Results File corresponding to an item 7 index from the Patient Description File must be separately scanned. If an item J entry in a particular column (represented by temp 2) is −1, then the computer is updated to the next item 7 index number and the record number column under that second number is then scanned. If the entry is other than −1, but is not test No. Y, then the computer is updated to J + 1 to look at the next record number column of the Past Results File. This is done with each item 1 of the Past Results File until Temp 2 is test Y, and then is done with each item 2 of the Past Results File until date Z is found. With the test number and date ordered found, item 3 of the Past Results File is then accessed to get the result of the past test. The routine is then completed as shown in FIG. 4. The header flags (−1) are provided in item 1 of the Past Results File for providing readouts of patient number and date completed for a particular test so that, for example, a sample listing can be provided for the technologist at the date collection station of what tests have been completed in a certain day.

FIG. 4 illustrates the routine of system 10 for obtaining a list of incompleted test and patients names. This would probably be done at a data collection station. The letter I represents all the record number columns from 1 to T + 1 in the Transaction File so that the routine runs until every column has been scanned and the computer has been updated to column T + 1. When the desired test X is found in an item 3 row, then item 5 in the Transaction File is accessed to determine if the listing in this item under test number X is <0. If the answer is yes, the test is incomplete, and the routine continues on to provide a listing of that sample number, patient number and name, etc. This is done for each text X found in the Transaction File. At the end of a day, all completed tests in the Transaction File are moved to the Past Results File, deleted from the Transaction File, and linking established from the Patient Description File to the Past Results File. Incompleted tests are deleted if item 5, TF is −1. If item 5, TF is −2 or −3 it is changed to −1 or −2 to hold the test in the Transaction File for an additional day or two. Note that the test life for a particular type of test can be designated in the Test Library Item 6.

The above description of the routines of FIGS. 2–5 point out the relationship between the four main files of the system of FIG. 1. It is through the provision of these files in a manner such as described in system 10, that objects of this invention are accomplished. However, the details of how the particular files are internally arranged and how they are accessed by a particular program can be varied without varying the basic system of this invention.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An automatic data processing system for handling medical and patient records on an in-line basis during daily functioning of a hospital comprising: a central station including data processing apparatus for storage and processing of medical and patient records, said data processing apparatus providing for storage of separate files which may be individually accessed for record storage or retrieval, said separate files including a Patient Description File for storing descriptive data on patients of said hospital, a Test Library File for storing data concerning pathological tests available at said hospital, a Transaction File for relatively short term storing of patient and test data being acted on, and a Past Results File for storing past patient test data; at least one test request station including a test request device for permitting an operator to enter a test request into said Transaction File for a particular test on a particular patient specimen, and a readout device for providing readout of data in said Transaction File, interface means connecting the test request device and the readout device to said Transaction File, at least one data collection station including at least one analytical device for performing a test, and interface means for permitting data collected at said data collection station to be transferred to said Transaction File and means for automatically transferring completed transaction data in said Transaction File into said Past Result File at preselected intervals of time.

2. A method of storing and retrieving pathological data in a hospital or clinic by use of a data processing machine, comprising the steps of storing information concerning a plurality of a pathological tests in said processing machine to comprise a Test Library File, including storage of an identification number for each such test; providing for readout of such information from said data processing machine for a specific test in response to a request to the machine by test number of a specific test; temporarily storing on line in a Transaction File in said data processing machine, data concerning a specific patient test, including storing a test accession number, test number, and patient number for each said test; providing for readout of data in said Transaction File of a specific patient test in response to a request including one of said test accession number, or patient number; storing in a Patient Description File in said data processing machine specific patient description information and storing a patient number for each patient, providing for readout of storage information concerning a particular patient in response to a request including the assigned patient number; providing a Past Result File for storage for a preselected relatively long period of time of test data concerning the patients described in said Patient Description File, which test data is periodically collected from said Transaction File over said period of time; and at preselected short intervals of time transferring test data stored in said Transaction File to said Past Result File for storage for said preselected relatively long period of time.

* * * * *